Patented Oct. 26, 1943

2,333,023

UNITED STATES PATENT OFFICE 2,333,023

CONTAINER WALL

Willard O. Manor, Monroe, Mich., assignor to Consolidated Paper Company, Monroe, Mich., a corporation of Michigan No Drawing. Application May 23, 1940, Serial No. 336,713

1 Claim. (Cl. 117—76)

This invention relates to shielding, protecting, and coating container walls, more particularly of fiber-like containers.

This invention has utility when incorporated in methods of compounding, and applying, and also in ingredients of compositions and their association, especially with reference to fiber types of containers with an undercoating for a barrier between the contents and the wall. The primary course herein is laying of a thin film, desirably of elastic or stretchable properties having toughness in maintaining a skin, upon a container wall or undercoating.

In the carrying out of the invention herein, such is in usual practice adopted in connection with a wall as the wall of a container. The containers may be of more or less permanent character and this coating may serve as a responsive serving means to effect isolation between the wall and contents. The wall may be of metal, wood, or even cementitious. In instances where the container proper is to be used only once the material may be fiber developed from rag, paper, grass, straw, or wood pulp, and compositions therewith, in the general class of fiber board, paper board, box board, and the like. The container, therefore, will serve generally in use for refill service.

As to the coatings or coating materials, special value has been developed in features of toughness or elasticity. In this type of compressible fiber board stock, such is frequently blanked out and sent in knocked-down shape to be built up into containers. In this blanking there may be scoring and marking. The coating may be applied during or before the blanking operation and will retain its properties during manufacture of the blank into a container even as to the corners where there has been scoring or folding. The purpose of the coating is to prevent the contents from sticking to the walls of the container. The contents may be hygroscopic, a solvent, vapor, grease or oil. Additional problems arise in the handling of hot substances. The substance to be placed in the container may have seemingly no affinity with the container or be readily separable therefrom, as for example, paraffine wax. Again, it may be a substance of a tacky or adhesive nature, such as asphalt.

Example of film coating

| | | |
|---|---|---|
| Starch material | pounds | 7 |
| Polyvinyl alcohol | do | 7 |
| Water | do | 200 | and may have

| | | |
|---|---|---|
| Tempering agent | pounds | 20 |

The undercoating may be

| | | |
|---|---|---|
| Kaolin | pounds | 265 |
| Water | do | 90 |
| Gum, as karaya | do | 5¾ |
| Carbonate, as ammonium | do | 13¾ |
| Glue | do | 13¾ | and may have

| | | |
|---|---|---|
| Glycerine | pounds | 51½ |
| Sodium nitrate | do | 5½ |
| Pigment as carbon black | do | 8 |
| Sodium benzoate | per cent | 1 |
| Tetra-sodium-pyro-phosphate | pounds | 1.3 | thinned with water to the consistency desired for applying.

In the event the container be one to be used say for a substance such as solids or liquids which have not tacky or penetrating attributes tending to destroy the container directly, there may be efficient operation in the functioning of a coating, say as developed from 50 per cent casava starch. Tapioca may be desirable in the field approaching merchandising costs desirable hereunder. With such 50 per cent starch, there may be equal quantity or 50 per cent of a film-forming chemical. These are in the fields of resins such as polyvinyl alcohol. In this compounding, referred to as equal quantities, there may be a variation in the starchy substances of as much as one-half and up to 100% of the film-forming material without starch. The traits to be considered are those of economy for the purpose sought. In this build-up for the solids of the starch and film-forming plastic such may be 7 pounds each with say 200 pounds of water. This thin gruel, desirably as a batch, may have a tempering, or water holding trait or softness characteristic imparted by some 20 pounds of glycerine. The pliancy or softness in achieving this non-drying factor for this tough characteristic may be attained for the plastic of the coating composition by the use of di-ethylene glycol, tri-ethylene glycol, or sulphonated oil, for example, sulphonated castor oil, in lieu of glycerine. This proportion of the tempering agent, when in the region of 20 pounds in the 214 pounds proportion suggested above, is of commercial economy.

For the purpose of meeting great resistance or establishing efficient separation between the wall and contents, a supplemental barrier or undercoat upon which this film coating as applied is located. For such undercoating in its elements there is desired a dispersion of a powder or powder-like material, desirably very fine and to have it effective in continuity. Such fine powdered material may be clays or silicates including kaolin. Such is wiped, laid, sprayed, or rolled say in association with water or a glue agent and thereby serve as an anchorage for the action of this film-carrying overcoating.

Instead of elementally handling this undercoat as merely the kaolin and the glue and water vehicle therefore, the extent may be for an efficient dispersion through the medium of a low grade karaya gum of high viscosity, which has been used in quantities and range from 5¾ to 7 pounds. In fact, instead of this karaya gum, gum arabic or gum tragacanth may answer; but commercially there has been advantage in the karaya type, and especially for its great rate of water solubility. With such a charge or quantity, there may be mixed in the solution running up to say 150 pounds water, a carbonate. This carbonate when an ammonium bicarbonate seems among the carbonates to contribute to a greater extent in smoothing out the mix and holding such for the degree of fluidity. While this proportion is given as 13¾ pounds, there is at times variation in the particular character of the gum and this quantity has been as to proportion increased or decreased as much as 50 per cent.

With this undercoating as to this viscosity or water-carrying traits established in a degree of stability for this smoothness, adhesive is to be incorporated therewith. Likewise for commercial purposes, a low grade animal glue may be taken, say in the quantity of the ammonium bicarbonate, 13¾ pounds. This glue, as dissolved in the water, may have its plasticizing properties increased desirably hereunder by the inclusion of say 5½ pounds of sodium nitrate therewith. While these proportions for the adhesive, sodium nitrate, glue, and water are suggested as 13¾ pounds of the glue as to like quantity of the ammonium bicarbonate, such may vary with or away from the carbonate.

Furthermore, in this primary or undercoating, there may be 51½ pounds of glycerine; or sulphonated castor oil 45 pounds. For a batch there may be the clay or kaolin, 265 pounds, with 90 pounds of water.

For pigment or coloring value, carbon black up to 8 pounds may establish a slate color. This may be of bone black, or in lieu thereof there may be rouge or other pigment coloring, and such may extend even up to 10 per cent of the solids.

In view of the fact that there are carbohydrates or organic substances in this vehicle, should there be not occasion for immediate use or to carry over in the mix, a preservative against untoward reaction is attained by the introduction of say up to 1 per cent of sodium benzoate. This will permit storing of the vehicle with or without the filler for a period of time even at normal weather temperatures.

In the compounding of this filler and carrier as an undercoating or barrier protected by the resilient or elastic film-carrying coating, there may be purpose in having such barrier effective in a minimum thickness. To such end, the dispersing or holding of the filler and its vehicle in uniformity of medium is attained say as along the lines of the batch discussed by the introduction of $1\frac{1}{10}$ pounds of tetra-sodium-pyro-phosphate. This deflocculating agent may be in even less proportion and contributes to the efficiency of the spread due to the maintained uniformity of the filler and its carrier. This primary or undercoating with its powdery filler is efficient as a coating. To prevent heat attacks it seems to have a tendency to turn chalky or revert to its powder state. In such transition as the barrier attributes are effective, there is ready severance between the contents and the container. When such contents be directly against this coating and such contents be of a tacky or adhering nature, the adherence is spent or dissipated on this filler-carrying coating of kaolin and leaves the container walls for ready severance therefrom. If the contents be not tacky or adherent as contrasted to asphalt, but of a readily frangible nature as exemplified by waxes and some resins, the cleavage or separation may be for this powdered coating or kaolin carrier to stay with the container wall. These experiences are developed even when there is heat reaction at the time of charging. In the event this kaolin be the undercoat and there is the overcoat of this film-forming plastic and starch, the tacky or adhesive trait due to its heat reaction may take either or both of these coatings therewith but leave the container wall isolated therefrom. However, with the substance a resin, non-adhesive or differing from the traits of asphalt, the severance may result in approximately all of each of the coats or residue thereof going with the container. The functioning in all instances is to the end that there is non-adherence and non-contamination between the material of the container and the container walls. In the practice hereunder, even from heat of the contents, the container wall, whether fiber, wood, metal, or cementitious, is immune from or resistant to attack by the contents.

What is claimed and it is desired to secure by United States Letters Patents is:

A coated container wall of fiber board or the like, comprising water-dispersed clay and adhesive in combination to provide sufficient holding characteristics to establish bonding mounting thereof upon such wall; and in association therewith a coating of polyvinyl alcohol and starch.

WILLARD O. MANOR.